United States Patent [19]

Reed et al.

[11] 4,166,834
[45] Sep. 4, 1979

[54] AIR INJECTOR NOZZLE FOR SECONDARY REFORMER

[75] Inventors: Robert D. Reed; Richard R. Martin, both of Tulsa, Okla.

[73] Assignee: John Zink Company, Tulsa, Okla.

[21] Appl. No.: 836,968

[22] Filed: Sep. 27, 1977

[51] Int. Cl.² .......................... B01J 8/02; B05B 1/14; C01C 1/04
[52] U.S. Cl. .................................. 422/148; 239/558; 422/310; 423/359; 423/651; 431/170
[58] Field of Search ................. 23/288 R, 277 R, 289; 48/196 A; 239/556, 558, DIG. 1; 423/359, 362, 363, 650, 651, DIG. 13; 431/170, 351, 354

[56] References Cited

U.S. PATENT DOCUMENTS

| | | | |
|---|---|---|---|
| 3,194,215 | 7/1965 | Barnes | 23/288 R X |
| 3,477,824 | 11/1969 | Reed | 23/288 R X |
| 3,519,396 | 7/1970 | Eagle et al. | 23/277 R |
| 3,848,811 | 11/1974 | Fryback | 23/288 R X |

FOREIGN PATENT DOCUMENTS 2234817  1/1975  France ................................... 239/558

*Primary Examiner*—Joseph Scovronek
*Attorney, Agent, or Firm*—Head, Johnson & Chafin

[57] ABSTRACT

An improved air injector for use in feed preparation in the primary reformer of a HABER processor for ammonia synthesis. In the HABER process, process gas is introduced at relatively high velocity downwardly in a process reactor through a vertical conduit. Along the axis of the conduit is an air supply pipe with a fixture which produces a plurality of downwardly and radially outwardly directed pipes attached to a plenum on the bottom of the air pipe. In this invention the number of circumferentially spaced pipes is doubled over the prior art and they are spaced circumferentially into rows directed outwardly at about a 45° angle so as to present, more or less, a continuous plurality of streams of air which block the annular space and force the downflowing process gas to be turbulently mixed with the air and to form a pressurized mass of process gas and air, which is then forced, by the gas pressure, to flow downwardly in, more or less, a uniform manner through a volume of catalyst.

4 Claims, 9 Drawing Figures

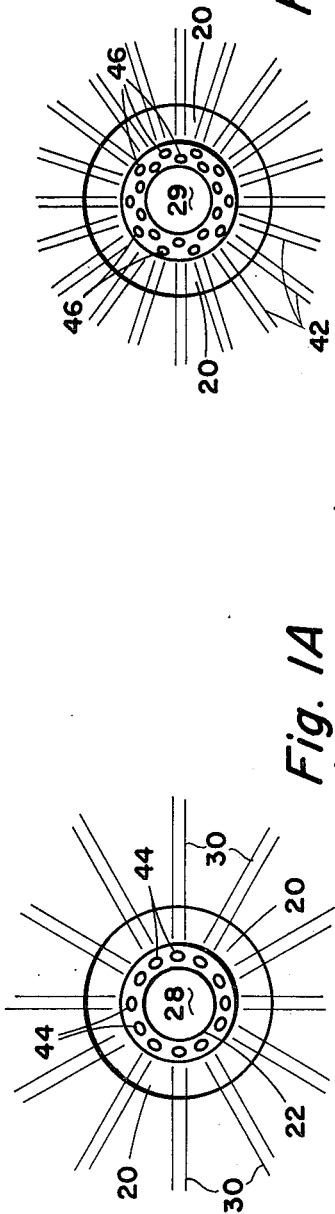
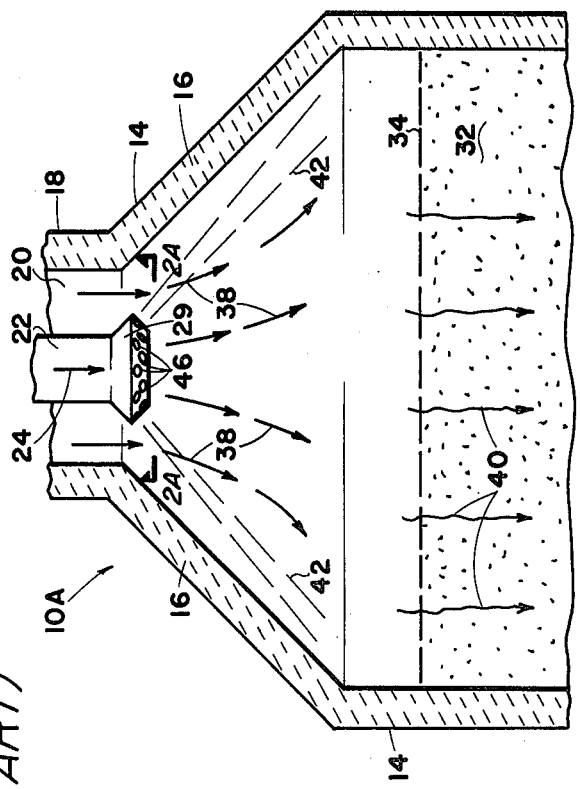
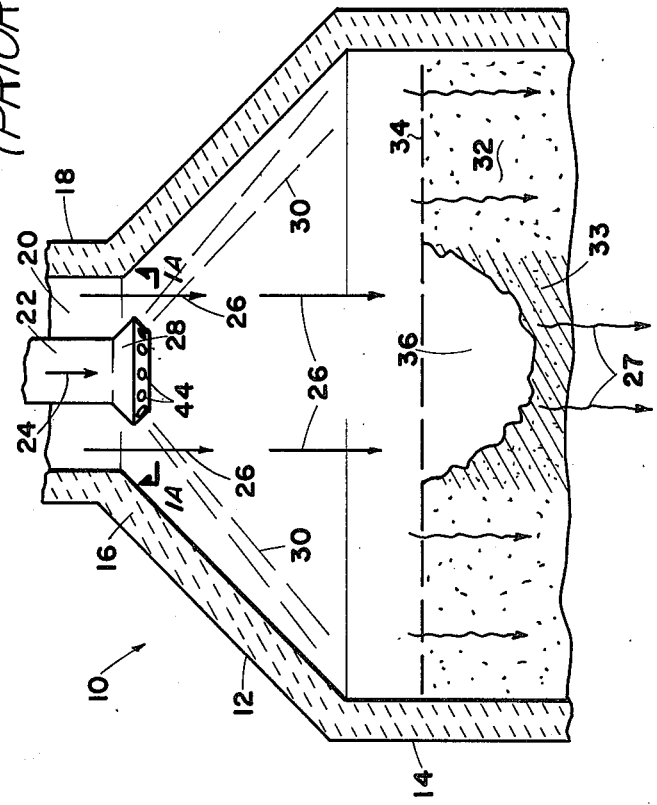

AIR INJECTOR NOZZLE FOR SECONDARY REFORMER

BACKGROUND OF THE INVENTION

1. Field of the Invention

This invention lies in the field of the apparatus for ammonia synthesis.

More particularly, this invention concerns the design of the air injector head for the purpose of injection of air to mix with the process gas into a secondary reformer in the HABER process of ammonia synthesis.

2. Description of the Prior Art

In the prior art, the air injector head has been a refractory covered series of circumferentially spaced air tubes connected to a plenum at the bottom end of the air supply pipe. This is centered in the top opening of the reactor and the process gases are introduced at substantial velocity in the annular space around the air pipe. The downward flow impinges on the outwardly moving jets of air to turbulently mix and burn.

However, because of the limited number of outwardly flowing jets, there were not enough to fully intercept the process gas flowing down the annulus and, therefore, this gas would proceed at high velocity, which is unimpeded and unreacted, to impinge on the horizontal surface of the bed of catalyst, through which the hot gases, which are the products of combustion of the process gas with the air jets, to provide a uniform mixture of high temperature gas to flow downwardly through the bed of catalyst.

To the extent that part of the downflowing process gas in not intercepted by the air jets, that part impinges at high velocity onto the surface of the catalyst bed, causing turbulent movement of the catalyst, and forming many fines, which block the interstices in the catalyst bed and build up flow resistance.

This invention is directed to the improvement of the contacting between the air jets and the process gas in this portion of the processing in the synthesis of ammonia.

SUMMARY OF THE INVENTION

It is the primary object of this invention to provide an improved apparatus for injecting air into the HABER reformer for combination with the process gas to be passed through the catalyst.

It is a further object of this invention to provide an air injector which provides a plenum from which a large plurality of jet-forming pipes are attached, in at least two layers, each set of pipes circumferentially spaced and directed in radial planes outwardly at a selected angle to the axis of the air pipes.

In the prior art, where a single row of ports is used, the number of ports which could be used was subject to limiting factors. One factor was the circumferential distance around the plenum to allow port insertion with adequate spacing between ports to prevent flame collapse enroute to the catalyst bed. A second was the provision of adequate air flow area in the total area of the ports for the quantity of air required, which established individual port area/diameter. A third was necessity for encasement/enfoldment of port tubes in suitable refractory for protection of the tubes from heat attrition. A fourth, due to the greater mass flow per port, was severe limitation of the included angle of the flame to avoid damaging impingement of flame on the refractory lining of the secondary reforming vessel.

The HABER Process for combining nitrogen and hydrogen to make ammonia for ammonia synthesis is well known in world industry, but procedure toward provision of the elemental components for the synthesis is somewhat involved, as there is preparation for the synthesis, and specific arts are involved. There is also invention in relation to the separate arts, see U.S. Pat. No. 3,477,824. These arts relate to nitrogen and hydrogen feed preparation for ammonia synthesis.

These and other objects are realized and the limitations of the prior art are overcome in this invention by providing a cylindrical plenum on the bottom of the air inlet pipe. There are two rows of jet pipes which pass through and are attached to the plenum. Control of air flow direction downstream of the pipes requires pipe length at least twice the pipe diameter. They are arranged symmetrically, circumferentially spaced in two rows, in radial planes, with each row having the same number of pipes. The jet pipes in one group are spaced at the midpoint between the planes of the jet pipes in the other group, so that, if there are ten pipes in each row, they will all be in vertical planes spaced from each other at 18°. Also, the port tube rows are spaced apart a vertical distance of at least 1.75 port tube diameters where all tubes are of substantially identical inside diameters.

This dense spacing of jet pipes and corresponding jets of air, which are directed outwardly at a selected angle, such as, for example, 45°, in the radial planes, forms a network of jets of air which cross the annular space between the air pipe and the inlet to the reformer. This forces a turbulent mixing of the air and the hot process gases to form a flame in which the chemical processing takes place as the hot gas moves downwardly under pressure through the horizontal bed of catalyst.

This large number and angular arrangement of the air jets that intercept the process gas, prevents the direct impingement of the process gas on the surface of the catalyst, which would turbulently mix the catalyst particles, causing them to break up into fine particles, which, under the flow of gas through the bed of catalyst, tends to block the interstices, and, therefore, cause a reduction in permeability, and a build up of pressure as the gas flows through the catalyst bed.

BRIEF DESCRIPTION OF THE DRAWINGS

These and other objects and advantages of this invention, and a better understanding of the principles and details of the invention, will be evident from the following description, taken in conjunction with the appended drawings, in which:

FIGS. 1 and 1A show a prior art design.

FIGS. 2 and 2A show in general cross-section an improved design of reformer system.

DESCRIPTION OF THE PREFERRED EMBODIMENT

Figure 3:
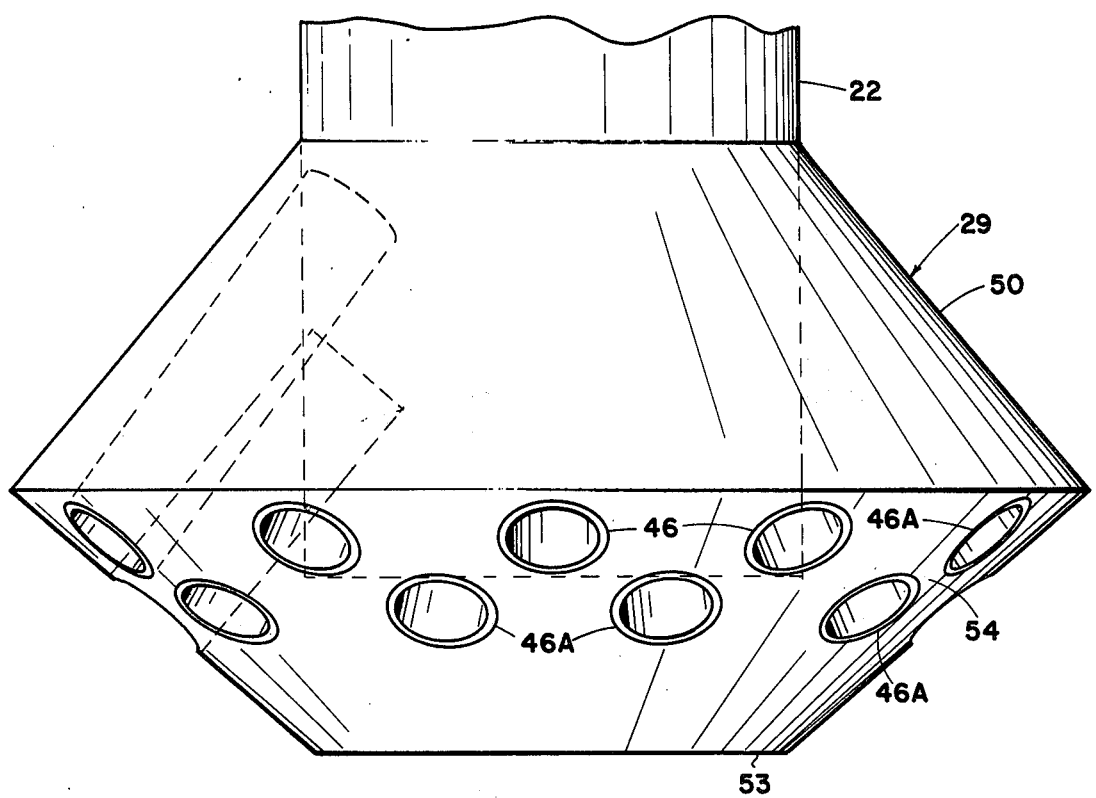
FIGS. 3 and 4 show elevation and plan views of an improved form of the air injection head.

Referring now to the drawings and, in particular, to FIG. 1 the apparatus is indicated generally by the numeral 10. It consists of a vessel having a conically expanding top portion 12 and a cylindrical lower portion 14 with a tubular portion 18 leading vertically downward and attached to the conical portion. The entire vessel, which is made of steel plate, is lined with appropriate refractory 16, as is well known in the art. The bottom portion of the vessel is filled to a selected level with suitable catalyst 32 as is well known in the art, having a surface 34. Not shown at the bottom of the reactor is a conduit for the passage of gases which have been introduced at the top of the vessel and which pass through the catalyst bed and are taken from the bottom of the vessel for further processing, as is well known in the art.

Along the axis of the upper cylindrical portion 18 is an air pipe 22 into which air is introduced under pressure in accordance with arrow 24. There is a plenum 28 at the bottom end of the air pipe 22, which carries a plurality of pipes 44 which are fastened through the wall of the plenum at selected angles, which are circumferentially spaced, and are protected by suitable refractory. The high pressure air produces jets of air in the form of a conical sheet, or series of jets.

The process gas flows downwardly through the annulus 20 between the cylindrical portion 18 and the air pipe 22 in accordance with arrows 26. Part of this downflowing process gas is intercepted by the jets and there is consequent mixing, and burning, or chemical combination.

However, because of the spaces between the individual air jets, there is some passage directly downward of the process gas in the center of the vessel. This high velocity flow causes a turbulent mixing of the catalyst particles. This bumping and mixing tends to break up the particles into a large number of very fine particles, which under the pressure of the gas flowing downwardly into the bed of the catalyst, tends to block the small interstices. This reducing of the permeability of the catalyst causes a build-up in resistance to flow and, therefore, a build-up in pressure inside of the vessel above the catalyst.

This area of the catalyst is indicated by the numeral 33, by different cross-hatching, as the area wherein the permeability has been reduced and, therefore, the effectiveness of the catalyst has been reduced.

FIG. 1A shows, in plan view, the relationship of the jets of air and flame in relation to the cross-section of the annular space 20. Large areas of 20 are unobstructed by air flow/flame 30.

Referring now to FIG. 2, there is shown in the plan view an arrangement of the air injection head with approximately twice as many jet pipes and corresponding jets of air from the plenum. Because of the greater number of uniformly spaced columns of air issuing from the jet pipes there is less opportunity for the process gas 26 not to be intercepted by the air jets. Consequently, the flow of the air jets and process gas indicated by the arrows 38, is not straight downwardly, as shown in FIG. 1 but is turbulently mixed with the air and is carried in a more-or-less uniform mixture of air and hot gas over the entire surface 34 of the catalyst 32. Less area of 20 is unobstructed. Consequently, under the pressure of the gas in the top portion of the vessel 10A, the gas will permeate downwardly through the catalyst 32 in accordance with arrows 40 to the outlet of the reactor vessel at the bottom thereof (not shown).

The illustration in FIG. 2 shows that the central portion of the catalyst bed is not eroded, and cavitated, by the flow energy of the process gases. It is clear that the erosive and cavitational effect will vary as the square of the velocity of the gas. By the impingement of the process gas on the jets of air, and their turbulent mixing, there will be less directed velocity to the gas in the space above the catalyst. Thus, this erosive effect and the break-up of the catalyst into fines, which plug the flow passages, will be less evident.

Also, the effect of the cavitation is to restrict and shorten the contact time between the gas and the catalyst as the flow of the gas passes through the catalyst. Also, because of the shortened contact time, part of the hydrocarbons which are introduced into the chamber fail to become involved in the chemical processing and, thus, are allowed to escape. Both of these effects are very undesirable and this is the basis for the improved construction.

By the turbulent mixing of the jets of air and the process gas there is, more or less, a uniform density of process gas mixed with air and of somewhat uniform velocity moving in different directions. The turbulent effect on the catalyst bed itself is minimized and a more-or-less uniform gas pressure forces the gas mixture then to pass downwardly through the catalyst bed.

Figure 4:
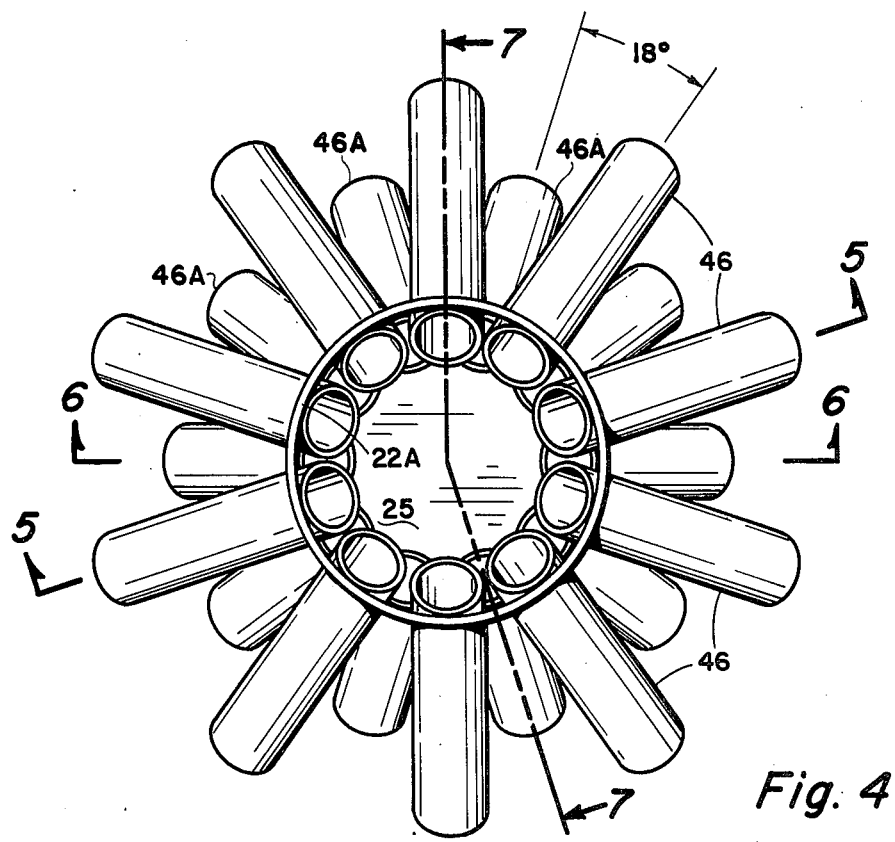
Figure 5:
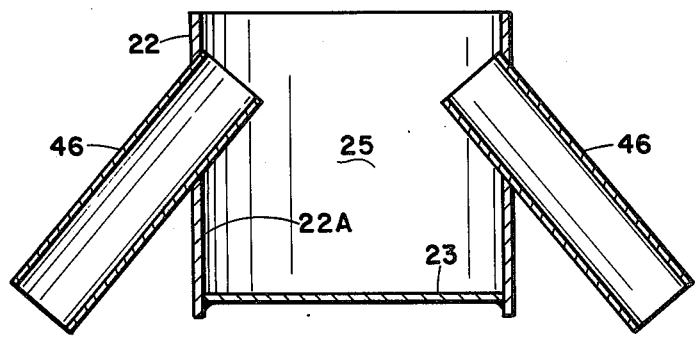
FIGS. 5 and 6 show cross-sectional views through planes 5—5 and 6—6 of FIG. 4.
Figure 6:
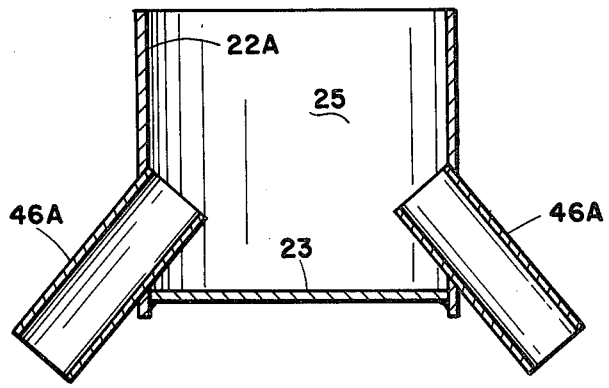

Referring now to FIGS. 3 and 4, there are shown in elevation and plan views, respectively, an improved construction of the air injector head 29. In FIG. 3, the pipes are shown encased in suitable refractory and the top surface of the conical-shaped volume, namely the cone 50, is covered with a steel plate so as to protect the refractory from the direct downward flow of process gases.

In FIG. 4 is shown the assembly prior to the addition of the protector cone 50 and the refractory. Here it can be seen clearly that there are two rows of spaced pipes passed through, and welded into the wall 22A of a plenum space 25, enclosed by the bottom plate 23 and the air pipe 22. There are two sets of pipes, an upper set 46 and a lower set 46A which are equal in number and equiangularly spaced. The bottom set is shifted by one-half the angle between the adjacent pipe 46 of the top set. Thus, if, for example, there are 10 pipes in each row, the angle between adjacent pipes in the plan view of FIG. 4 will be approximately 18°. Thus, the downflowing process gas will be almost completely intercepted by the air jets, which is the desired objective of this apparatus.

Figure 7:
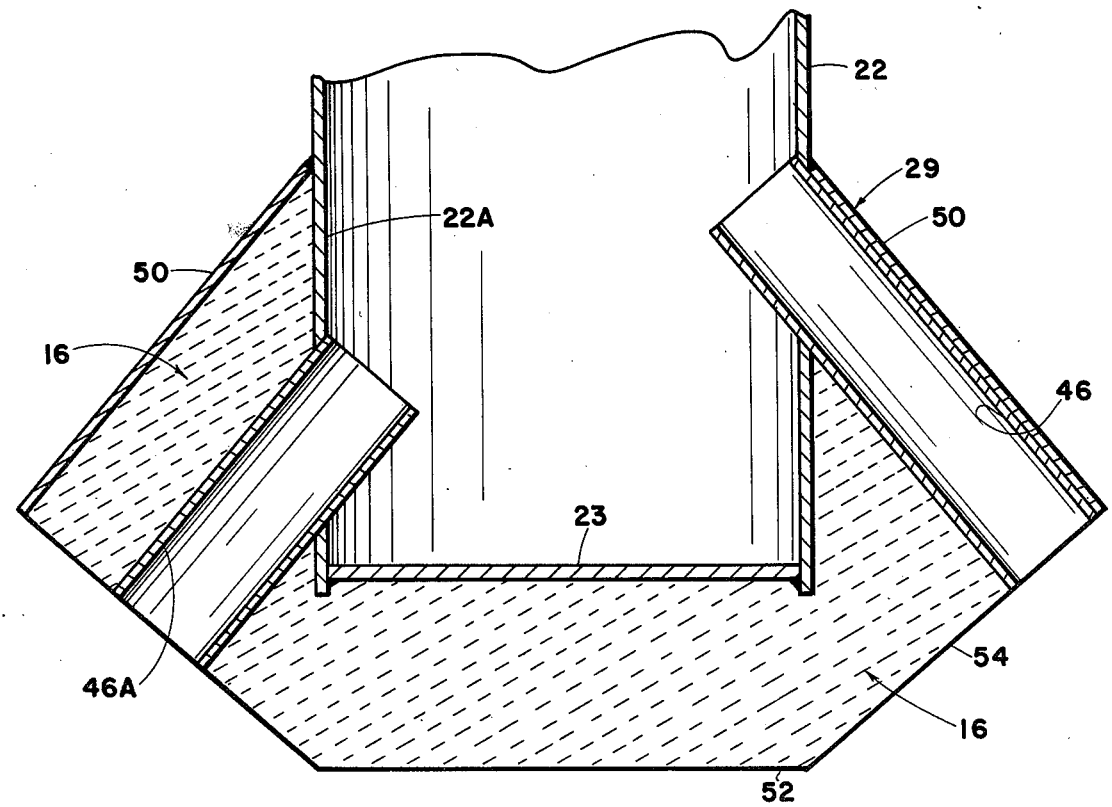
FIG. 7 shows a cross-section taken along plane 7—7 of FIG. 4.

Referring now to FIG. 7, there is shown a cross-section taken along the broken plane 7—7 of FIG. 4 which shows the construction of FIG. 3 illustrating only one each of the two sets of jet pipes 46 and 46A. These are also indicated in dashed line in FIG. 3.

There are essentially two parts to this invention, one of which is the large increase in the number of jet pipes and their closer angular spacing which is made possible by the two sets of jet pipes. Also, the use of tubular ports for radial attachment to the central air supply plenum and the continuous encasement of these pipes with the refractory for unimpeded air discharge is a further improvement. Also, better coverage of areas downstream of the jet tubes, which is so important, is best served by equipping each port circle with a maximum number of jet tubes where the jet tube locations for upper and lower ports are staggered equally. Also, it is preferable, although not demanded, to have the port tubes, or jet tubes, with the same angle to the axis. Thus, the angle between the axis of the pipes and the vertical axis of the air pipe is the same for each of the jet pipes. This insures that the spacing between the outlets of each of the jet pipes will be substantially the same for each adjacent pair of pipes. This helps to prevent mutual attraction of the low pressure areas within each stream, as discharged. This avoids the collapse of the flame produced, as air is discharged from each tube to contact and mix with combustible gases, at temperatures above their ignition points.

The number of jet tubes preferred is ten in the upper group and ten in the lower group, as is illustrated. However, as few or as many as may be required for complete circular flow areas coverage may be used. The important point is that substantially the entire annular cross-sectional area for the downward flow of process gas should be covered by the jets, so as to fully intercept the downward flow of process gas to mix with the jets of air.

While the invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed is:

1. In a secondary reformer in a HABER-type ammonia synthesizer, comprising a cylindrical pressure reactor having a tapered top contour terminating in a vertical axial inlet conduit, said inlet conduit having an axial air pipe, supporting an air plenum closed at its bottom end, and including means to flow the process gases downwardly in the annular space between said inlet conduit and said air pipe; the improvement in an air jet head for said air plenum, comprising:
   (a) a plurality of air jet pipes inserted and sealed through the wall of said air plenum, arranged symmetrically circumferentially, in equal number, in each of two rows, spaced a selected vertical distance apart axially of said plenum, whereby the stream of air issuing from each of said air jet pipes is independent to prevent collapse of the low pressure area of any other stream of air from any other of said pipes, each air jet pipe in a radial plane at a selected angle A to the axis of said plenum, the planes of said air jet pipes in one row bisecting the angles between pairs of pipes in the other row;
   (b) a conical metal covering for said jet pipes having the same angle A to the axis of said pipe;
   (c) the space around said air jet pipes beneath said covering filled with selected refractory out to the ends of said jet pipes; and wherein
   (d) the length of said air jet pipes in the upper row is greater than the length of said air jet pipes in the lower row and wherein the length of all of said pipes is equal to at least twice their inside diameter.

2. The system as in claim 1, wherein said air jet pipes of said two rows are vertically spaced apart at least 1.75 inside diameters of said jet pipes where all of said jet air pipes are of substantially identical inside diameters.

3. The system as in claim 1, wherein the downstream ends of said air jet pipes of said two rows are flush with, but unobstructed by, said selected refractory covering.

4. The system as in claim 3 in which the surface of said refractory covering is a conical surface.

* * * * *